Aug. 14, 1956

W. KROZAL 2,758,573

GEAR TYPE HYDRAULIC UNIT

Filed Dec. 20, 1954

INVENTOR.
WILLIAM KROZAL
BY
*Whittemore,*
*Hulbert & Belknap*
ATTORNEYS.

Aug. 14, 1956 W. KROZAL 2,758,573
GEAR TYPE HYDRAULIC UNIT
Filed Dec. 20, 1954 3 Sheets-Sheet 2

INVENTOR.
WILLIAM KROZAL
BY
ATTORNEYS

Aug. 14, 1956   W. KROZAL   2,758,573
GEAR TYPE HYDRAULIC UNIT
Filed Dec. 20, 1954   3 Sheets—Sheet 3

INVENTOR.
WILLIAM KROZAL
BY Whittemore,
Hulbert & Belknap
ATTORNEYS

United States Patent Office
2,758,573
Patented Aug. 14, 1956

2,758,573

GEAR TYPE HYDRAULIC UNIT

William Krozal, Harper Woods, Mich.

Application December 20, 1954, Serial No. 476,310

22 Claims. (Cl. 121—68)

The present invention relates to a gear type hydraulic unit, and more particularly, to one which employs an internally toothed annular member in conjunction with an externally toothed inner member in mesh with the teeth of the annular member.

The present invention is a continuation-in-part of my prior copending application Serial No. 290,021, filed May 26, 1952, now abandoned.

It is an object of the present invention to provide a hydraulic unit of the class described, characterized by its simplicity, its high efficiency, and its adaptability to a wide variety of practical applications.

It is a further object of the present invention to provide a device of the character described in which the teeth of the members mesh to form closed chambers of pockets which expand and contract during relative rotation between the members, in combination with means for controlling the admission and exhaust of hydraulic fluid under pressure to said chambers.

It is a further object of the present invention to provide, in a device of the character described, an internally toothed annular member having tooth spaces extending parallel to each other in combination with an inner member having teeth, the crests of which are of cylindrical shape and comprise more than 180 degrees of a cylinder, and in which the teeth of the annular member are twice as many as the teeth of the inner member.

It is a further object of the present invention to provide a device of the character described including fluid supply and exhaust passages extending from the crests of the teeth of the inner member to an inner surface thereof slidably associated with the outer surface of a crank pin, the outer surface of the crank pin having supply and exhaust ports therein, in combination with relief passages communicating with the supply and exhaust passages.

Other objects and features of the invention will become apparent as the description proceeds, especially when taken in conjunction with the accompanying drawings, wherein.

Figure 2:
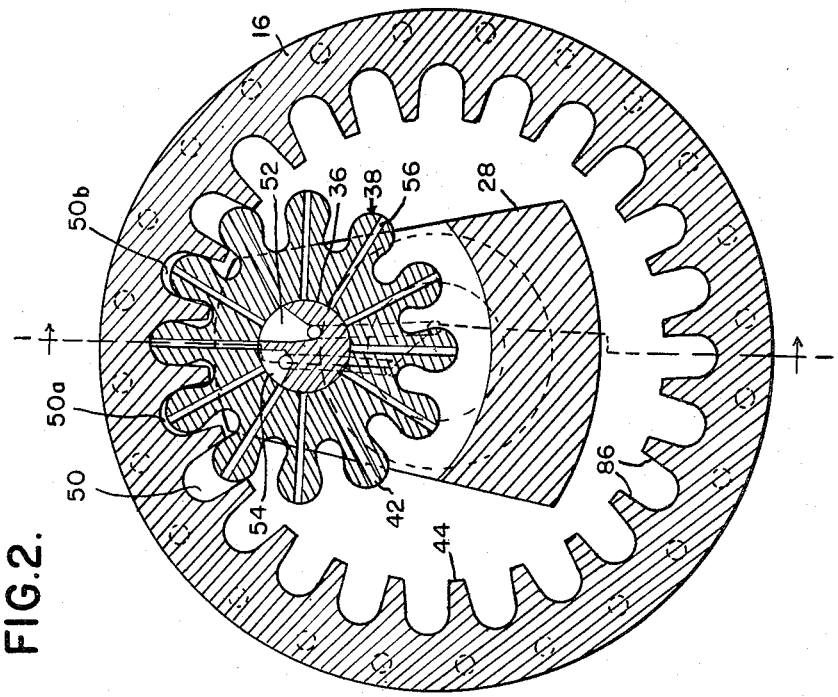
Figure 2 is a transverse sectional view through the device substantially on the line 2—2, Figure 1.
Figure 1:
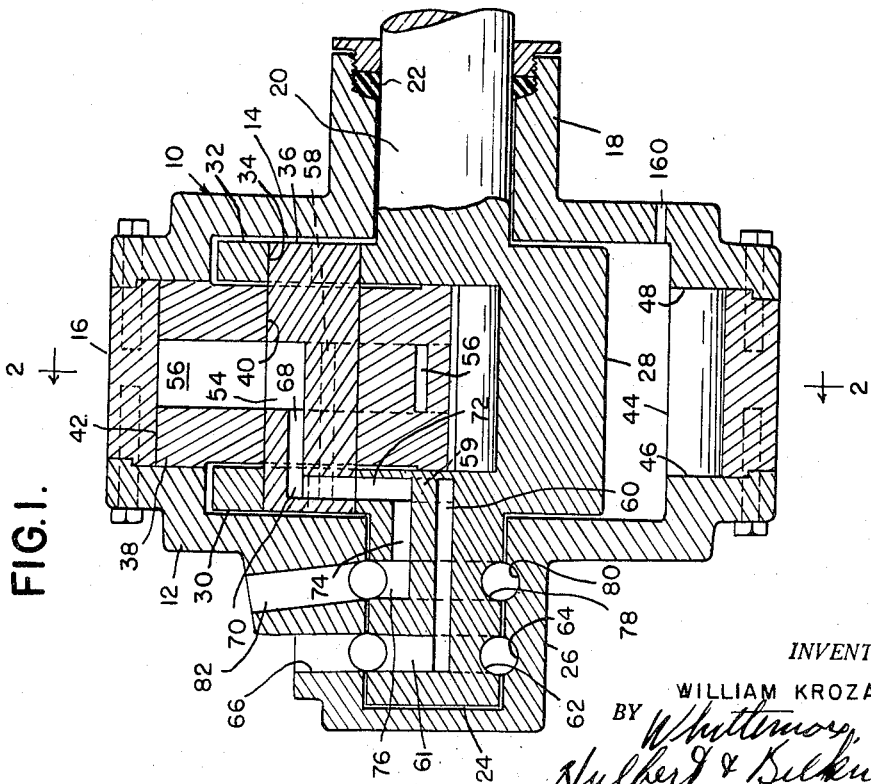
Figure 1 is an axial sectional view through a hydraulic device taken substantially on the line 1—1, Figure 2.

Referring now to Figures 1 and 2 the hydraulic device comprises a housing 10 comprising housing members 12 and 13 which are spaced axially and which receive therebetween an internally toothed annular member 16. The housing member 14 includes a collar 18 which receives the shaft portion 20 of a crank shaft, a suitable sealing gasket being indicated at 22. The end 24 of the crank shaft is received within an enlargement 26 forming a part of the housing member 12. The crank includes a counterbalance portion 28 and diametrically opposite to the counterbalance portion 28 are a pair of webs 30 and 32. Between the webs and received in openings 34 therein is a crank pin 36.

Rotatably mounted on the crank pin 36 is an inner gear member 38 having a central opening 40 slidable in rotation on the outer surface of the crank pin 36.

As the crank rotates on its axis the crank pin 36 revolves around the axis of the crank shaft 20 and carries the inner gear member 38 therewith. The inner gear member 38 is provided with teeth 42 which are conjugate to the teeth 44 of the annular gear member. Housing members 12 and 14 include surface portions 46 and 48 which extend perpendicular to the axes of the gear members and which cooperate with the teeth 42 and 44 to provide substantially closed pockets or chambers 50 as the internal gear member is revolved about the axis of the crank shaft 20.

Means are provided for controlling the flow of hydraulic fluid under pressure to and from the pockets 50 in a manner to produce rotation of the inner gear member 38. This means comprises supply and exhaust ports 52 and 54 on the outer surface of the crank pin 36. Each of the teeth 42 of the inner gear member 38 is provided with a supply and exhaust passage 56 which extends from the crest of the tooth to the surface of the central opening 40 of the gear member 38. The port 52 is connected by passages 58, 59, 60 and 61 to an annular groove 62 formed on the end 24 of the crank shaft. The groove 62 is in registration with an internally formed groove 64 provided in the enlargement 26 of the housing member 12 and this in turn communicates with a passage 66 which may be connected by suitable conduit means (not shown) to one side of a hydraulic pump. The port 54 communicates by passages 68 and 70 formed in the crank pin 36, and passages 72, 74 and 76 formed in the crank, to an annular groove 78 surrounding the end 24 of the crank shaft 20. The groove 78 is in registration with a groove 80 formed in the enlarged portion 26 of the housing member 12 and the groove 80 communicates with a passage 82 which may be connected by suitable conduit means (not shown) to the other side of a hydraulic pump.

Inasmuch as the teeth 42 and 44 are conjugate to each other and since the teeth 42 of the inner gear member extend to the surfaces 46 and 48 of the housing members, admission of hydraulic fluid under pressure into the pocket or chamber 50 at one side of the centerline of the assembly, as seen in Figure 2, will produce actuating forces tending to rotate the inner member relative to the annular member and hence to produce rotation of the crank shaft 20. If for example, fluid under pressure is admitted to the port 54, forces are developed tending to force the corresponding tooth 38 out of its pocket (such for example as the pocket 50a) and thus to produce clockwise rotation of the crank shaft 20. At the same time, fluid trapped within a pocket at the other side of the centerline (such for example as the pocket 50b) is expelled through the passage 56 to the port 52 and thence to the hydraulic pump.

As thus far described, the teeth of the annular member and of the inner member may be of any conjugate form, it being a property of conjugate teeth that both sides of a tooth will be in contact simultaneously with opposite side of the tooth space in which it is received. Thus, for example, the teeth of the members may be involute in form. However, the variation in volume between involute teeth is relatively small and improved results are obtained when a particular tooth form is employed. In the preferred form of the invention the side walls 86 of each tooth space of the annular member 16 are parallel and the teeth 42 of the inner gear member 38 are of cylindrical shape at the crests thereof. The crests of the teeth 42 are of cylindrical shape throughout an angular extent of somewhat in excess of 180 degrees. With this arrangement the teeth 38 operate as pistons in the tooth spaces between the teeth 44 of the annular member and relatively great variation in volume of the pockets 50 is thus produced. The foregoing arrangement depends upon providing a number of teeth 44 on the annular member 16 which is exactly twice the number of teeth on the inner gear member 38. With this arrangement each of the teeth 42 of the inner gear member 38 moves diametrically across the annular member 16, thereby moving radially out of a pocket 50 and moving radially into a pocket 50 diametrically across from the pocket from which it was previously withdrawn.

Figure 3:
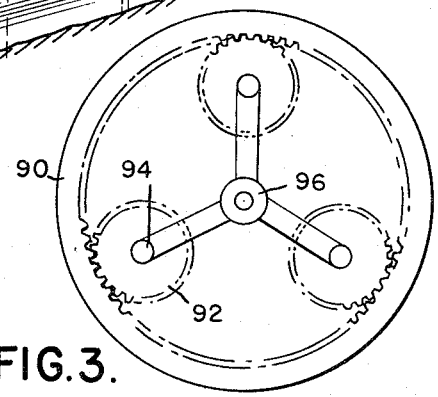
Figure 3 is a diagrammatic view of a different embodiment of the present invention.

Obviously, in employing the parallel sided tooth spaces in the annular member and the cylindrically formed tooth on the inner gear member, it is possible to provide only a single inner gear member on the crank. However, where teeth of different configuration are employed, such for example as involute teeth, it is possible to provide for a plurality of inner gear members in mesh simultaneously with an external gear member. Such an arrangement is diagrammatically indicated in Figure 3 where an internally toothed annular member 90 is shown as cooperating with three externally toothed inner gear members 92, each of which is mounted for rotation on a crank pin 94 extending radially from a crank 96.

Figure 4:
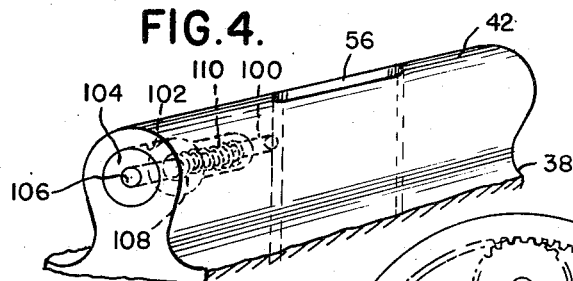
Figure 4 is an enlarged perspective view of a tooth of the inner member.
Figure 5:
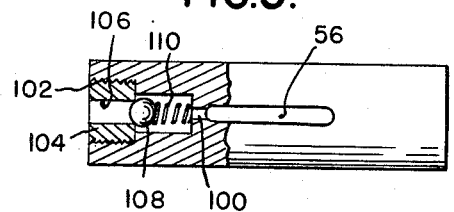
Figure 5 is a plan view of a tooth of the inner member with parts broken away.

Referring now to Figure 4, there is illustrated mechanism for improving the operation of the hydraulic unit previously described. In this case the tooth 42 of the inner member 38 is shown as provided with a passage 100 communicating with the supply and exhaust passage 56 therein and extending to one end of the tooth 42. For this purpose the end of the tooth is provided with an enlarged cylindrical bore 102 in which is received a plug 104 having a passage 106 extending therethrough. The passage 106 provides a valve seat on which is seated a relief valve 108 held in place thereon by a compression spring 110. The arrangement is such that when suction develops within the passage 56, the valve 108 lifts from its seat and hydraulic fluid flows into the passage 56 through the passages 106 and 100.

Figure 6:
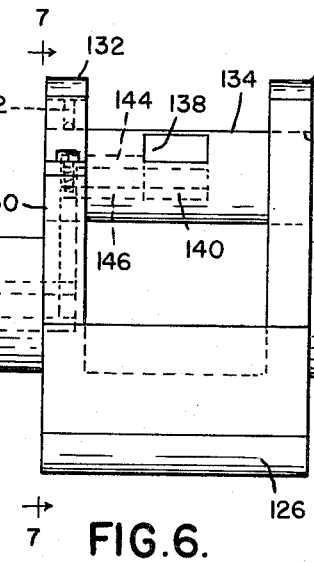
Figure 6 is a fragmentary side view of a portion of the crank employed in an embodiment of the present invention.
Figure 7:
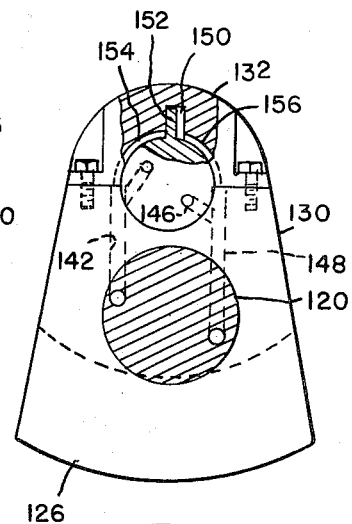
Figure 7 is a section on the line 7—7, Figure 6, with parts broken away.

Referring now to Figures 6 and 7 there is illustrated a further improvement in the basic hydraulic unit illustrated in Figures 1 and 2. In these figures the crank comprises a crank shaft 120 having annular grooves 122 and 124 at one end thereof corresponding to the grooves 62 and 78 previously described. The crank includes a counterbalance portion 126 and extending radially from the crank shaft 120 and diametrically opposite the counterbalance portion 126 is a web 128 which may be integral with the crank shaft. Cooperating with the web 128 is a web portion 130 provided with a removable cap 132, the web portion 130 and the cap 132 being recessed to receive one end of a crank pin 134. The other end of the crank pin 134 is rotatably received within an opening 136 formed in the web 128. The crank pin 134 is provided with supply and exhaust ports 138 and 140 suitably connected by passages to the annular grooves 122 and 124. One of the passages includes a drilled passage 142 which communicates with one of the passages 144 or 146 which in turn communicate with the supply and exhaust ports 138 and 140. In addition, the web portion 130 is provided with a passage 148 which communicates through passage 146 to the other of the supply and exhaust ports 138 and 140.

The cap 132 is provided with a pocket 150 formed therein and the crank pin 134 adjacent one end has a vane 152 received within the pocket 150. A fluid passage 154 extends from the passage 142 to one side of the pocket 150 and a second passage 156 extends from the passage 148 to the other side of the pocket 150. Thus, when fluid is admitted under pressure to the passage 142, the pressure of this fluid is applied to the vane 152 to the left thereof as seen in Figure 7, thereby shifting the vane 152 to the right hand side of the pocket 150. When the direction of flow of fluid to the hydraulic unit is reversed, pressure is admitted through the passage 156 to the right hand side of the pocket 150, thus forcing the vane 152 to the left thereof. There is thus provided automatic means for shifting the crank pin 134 and hence the location of the ports 138 and 140 in accordance with the direction of flow of fluid through the unit. This may be considered as a timing device and insures proper location of the supply and exhaust ports for rotation of the inner gear member in either direction.

In operation the hydraulic unit is connected to a closed hydraulic system completely filled with hydraulic fluid. Housing members 12 and 14 together with the annular member 16 form a sealed housing or enclosure and this housing is completely filled with oil. If fluid is admitted under pressure to the passage 66 or 82 and the remaining passage connected to the intake side of the pump, fluid will be forced through the hydraulic unit and will result in rotation of the inner gear 38 about its axis and a revolution of the gear about the axis of the crank shaft 20, thus imparting rotation to the crank shaft. Leakage fluid which escapes from the pockets 50 remains within the sealed housing and preferably a drain passage is provided for returning this leakage fluid to the closed hydraulic system. A drain passage for this purpose is indicated at 160.

While the unit has thus far been described primarily as a motor unit in which fluid under pressure is supplied to one of the ports 52 or 54, it will be appreciated that the unit may operate equally well as a brake, in which case the unit itself operates as a pump and the resulting flow of fluid may be throttled or opposed as desired to effect a braking action.

Figure 8:
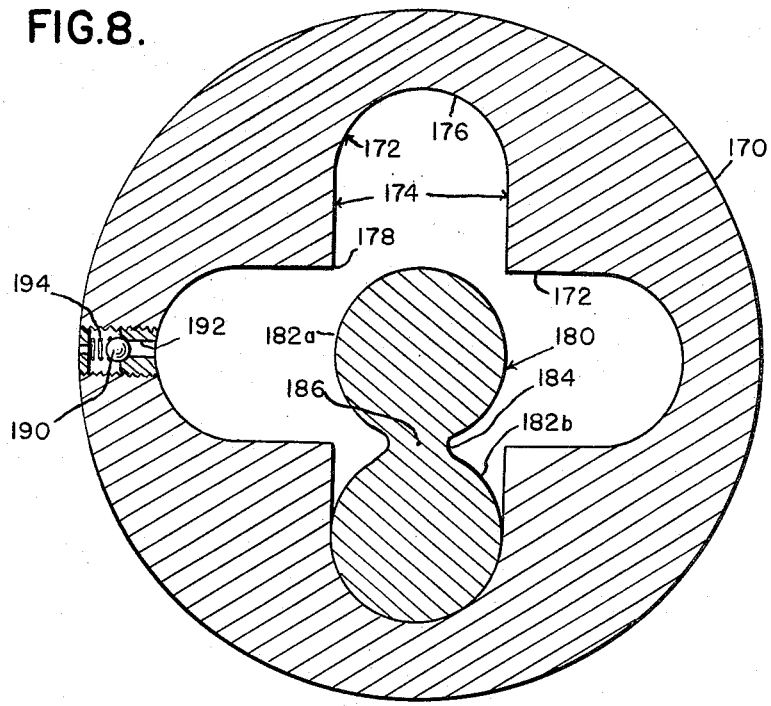
Figure 8 is a sectional view, partly diagrammatic, showing a simple form of the present invention.

Referring now to Figure 8 there is illustrated a simplified embodiment of the present invention. In this case an annular member is illustrated at 170 having a plurality of radially extending slots or tooth spaces 172 each of which is illustrated as having flat parallel sides 174 which are parallel to a line radial of the annular member. The outer ends of the straight flat parallel sides 174 are connected by a cylindrical surface 176 which comprises 180 degrees of a cylinder. In the illustrated embodiment of the invention four slots 172 are provided each spaced apart circumferentially at 90-degree angles. The flat side walls 174 of the slots may intersect in sharp corners as indicated at 178. It is emphasized however that even though the flat side walls are continued to sharp intersections, no interference with the inner toothed member results.

The inner toothed member is indicated at 180 and in the illustrated embodiment of the invention comprises two generally cylindrically formed teeth 182a and 182b each of substantially more than 180 degrees of angular extent. The teeth 182 are interconnected by a reduced neck 184 and are provided with an axis of rotation indicated at 186. Cylindrically formed tooth portions 182a and 182b are in a relative position corresponding to two tangent cylinders.

In the position illustrated in Figure 8 it will be observed that the tooth 182a has the center of its cylindrical ly formed portion located concentric with the geometric center of the annular member 170. At the same time the tooth 182b is fully seated in a tooth space or slot 172.

In operation the inner member 180 may be revolved with its center 186 moving in a circular orbit about the geometric center of the annular member 170, while the member 170 remains stationary. If this gyratory motion is imparted to the inner member, the tooth 182b will move from the position shown with its geometric center moving along the vertical line extending through the center of the annular member 170 until it occupies a position in the upper slot 172. During this movement the tooth 182a will have moved into one or the other of the horizontally extending slots 172, depending upon the direction of gyration of the inner member.

It will be appreciated that as soon as a diameter of a tooth 182a or 182b extends into a tooth space or slot, a chamber is provided which may be a pumping chamber or a motor chamber, depending upon the operation of the unit. In Figure 8, the inner member 180 is illustrated in dotted lines in an intermediate position in which the tooth 182b is just moving out of the lower tooth slot whereas the tooth 182a is just entering the right hand slot 172.

Instead of producing the relative motion between the annular member 170 and the inner member 180 by orbital movement of the inner member, the two parts may roll together in the manner of an internal gear and pinion. This is advantageous in some utilizations of the device since it prevents the device from developing centrifugal forces or vibrations in use.

It will be appreciated that in the device illustrated in Figure 8, fluid passages may be provided in the tops of the teeth or in the tooth spaces by appropriate ports provided in a side plate against which the annular member 170 rotates. Also, valve means may be provided communicating with the pumping or motor chambers which are controlled by a check valve. Thus, a ball 190 may be urged against a valve seat communicating by a passage 192 with the bottom of a slot 172, the ball being normally retained on its seat by spring means indicated at 194. As the tooth 182a moves into the left hand slot 172 fluid trapped therein is forced out through the passage 192 past the valve 194. Similar valves may be provided for each of the slots, and fluid inlet into the pump constituted by this device may be generally centrally so as to maintain the space within the annular member 170 completely filled with fluid.

Figure 9:
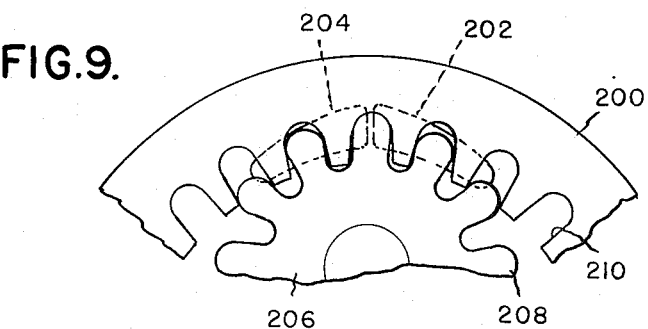
Figure 9 is a fragmentary elevational view of parts showing a different arrangement of fluid ports.

In Figure 9 an alternate arrangement is illustrated where a plate in back of the annular member 200 is provided with ports 202 and 204, one of which will be an inlet port and one of which will be an outlet port. The inner member 206 is provided with teeth 208 each including a cylindrical portion of more than 180 degrees in extent and communicating with straight sided cylindrically bottomed slots 210 as previously described. If the teeth 208 are equal to one-half the number of slots 210, as previously described, each tooth will have relative movement diametrically across the annular member into and out of two diametrically opposed slots.

The unit is capable of a wide variety of uses but among those which may be mentioned is in the drive of an automotive vehicle in which one of the units will be associated with each of the driving wheels of the vehicle. In this use of the device it may serve the dual function of a drive unit and a brake unit by appropriate control of the external hydraulic system.

The drawings and the foregoing specification constitute a description of the improved gear type hydraulic unit in such full, clear, concise and exact terms as to enable any person skilled in the art to practice the invention, the scope of which is indicated by the appended claims.

What I claim as my invention is:

1. A hydraulic unit comprising an annular member having internal radially directed teeth defining tooth spaces therebetween, an externally toothed inner member having teeth conjugate to the teeth of said annular member and meshed therewith, closure plates at the sides of said annular member closing the ends of its tooth spaces, the ends of the teeth of said inner member fitting closely between said plates whereby each tooth of said inner member while in mesh with said annular member forms with the two adjacent teeth thereof and with said closure plates a substantially sealed chamber whose volume is variable as said members roll in mesh, a crank shaft concentric with said annular member, an eccentric crank pin on said crank shaft on which said inner member is rotatable for guiding said inner member for relative revolving movement around the interior of said annular member, and fluid control means for controlling the flow of fluid under pressure to and from said chambers, the teeth of said inner member having fluid passages extending from their crests to the surfaces engaging said crank pin, and said crank pin having fluid supply and exhaust chambers sequentially registerable with said passages.

2. A unit as defined in claim 1 in which said crank pin is rotatable with respect to said crank shaft, and fluid operated means for shifting said crank pin between limits upon reversal of flow of fluid to and from its chambers.

3. A unit as defined in claim 1 in which the teeth of said inner member are provided with relief passages communicating with the aforesaid sealed chambers, and relief valve means arranged to open as a result of reduced pressure within said chambers.

4. A unit as defined in claim 1 in which the teeth of said inner member have relief passages extending from an end thereof longitudinally of the teeth and communicating with the aforementioned fluid passages therein, and relief valves in said passages.

5. A unit as defined in claim 4 in which said relief valves are arranged to open on reduced pressure within said chambers.

6. A hydraulic unit comprising an annular member having internal radially directed teeth defining tooth spaces therebetween, an externally toothed inner member having teeth conjugate to the teeth of said annular member and meshed therewith, closure plates at the sides of said annular member closing the ends of its tooth spaces, said annular member having twice as many teeth as said inner member, the tooth spaces of said annular member having parallel opposed walls, the teeth of said inner member having top portions which are of cylindrical cross-section of more than 180 degrees angular extent, the diameter of the cylindrical portion of said teeth being substantially equal to the distance between the parallel opposed walls of the tooth spaces of said annular member to operate therein as pistons, guide means for guiding said members for relative revolving movement of said inner member around the interior of said annular member, and fluid control means for controlling the flow of fluid under pressure to and from said chambers including fluid passages opening into the crests of the teeth of said inner member.

7. A hydraulic unit comprising a casing having side walls and an annular internally toothed gear between said side walls, a crank shaft coaxial with said internal gear, an eccentric crank pin on said crank within said casing, an inner gear carried by said crank pin and meshed with said annular gear, and fluid control means for admitting fluid under pressure into chambers formed between the meshed teeth of said gears, said fluid control means comprising passages extending through said crank shaft to said crank pin, supply and exhaust chambers on said crank pin to which said passages connect, and fluid flow passages extending from the crests of the teeth of said inner gear to the surfaces thereof in contact with said crank pin.

8. A unit as defined in claim 7, said annular gear having twice as many teeth as said inner gear, the sides of the tooth spaces of said annular gear being parallel and the teeth of said inner gear including cylindrical tops of more than 180 degrees extent fitting snugly within the tooth spaces of said annular gear.

9. A unit as defined in claim 7, the crank pin being mounted for limited rotation about its axis, and fluid controlled means responsive to the direction of flow of fluid through said supply and exhaust passages for shifting said crank pin between its limiting positions.

10. In a hydraulic unit of the class described, a crank comprising a crank shaft and a crank pin, supply and exhaust ports on the surface of said pin, supply and exhaust passages extending through said shaft to said ports, said pin being mounted for angular adjustment on said crank, means responsive to fluid pressure within said passages for angularly adjusting said pin, a gear on said pin, passages extending from the crests of the teeth of said gear to the surface of said gear engaging said pin, and an internal gear with which said first gear is meshed.

11. A hydraulic unit comprising an annular member having internal radially directed teeth defining tooth spaces therebetween, an externally toothed inner member having teeth conjugate to the teeth of said annular member and disposed to contact both sides of the tooth spaces of said annular member throughout a substantial arc of rotation and meshed therewith, closure plates at the sides of said annular member closing the ends of its tooth spaces, the ends of the teeth of said inner member fitting closely between said plates whereby each tooth of said inner member while in mesh with said annular member forms with the two adjacent teeth thereof and with said closure plates a substantially sealed chamber whose volume is variable as said members roll in mesh, a crank having a portion within said annular member including radially extending webs, a crank pin between said webs, said inner member being mounted for rotation on said pin and having an inner surface slidable around said pin, fluid supply and exhaust ports on said pin, fluid passages extending from the crests of the teeth of said inner member to the inner surface thereof and registerable sequentially with said ports.

12. A unit as defined in claim 11 in which there are provided a plurality of crank pins and inner members within said annular member.

13. A unit as defined in claim 11 in which said annular member has twice as many teeth as said inner member, and the tooth spaces of said annular member have parallel sides, the teeth of said inner member having crests of cylindrical form of more than 180 degrees extent fitting snugly into said tooth spaces.

14. A unit as defined in claim 11 in which said crank pin is angularly movable between said webs, and means responsive to fluid pressure supplied to said ports for moving said crank pin.

15. A unit as defined in claim 14 comprising stop means limiting angular movement of said crank pin.

16. A unit as defined in claim 11 comprising relief passages connecting the fluid passages of the teeth of said inner member, and check valves in said relief passages.

17. A unit as defined in claim 11 comprising housing means completely enclosing said members, means maintaining said housing means completely filled with hydraulic fluid, and a fluid line communicating with the interior of said housing means to draw excess fluid therefrom.

18. A unit as defined in claim 11 comprising a sealed housing in which said members are mounted, said housing being completely filled with hydraulic fluid, means for supplying hydraulic fluid to and exhausting hydraulic fluid from said ports, said housing having a passage connecting to its interior for withdrawing leakage fluid therefrom.

19. A hydraulic unit comprising an annular member having internal radially directed teeth defining tooth spaces therebetween, an externally toothed inner member having teeth conjugate to the teeth of said annular member and meshed therewith, closure plates at the sides of said annular member closing the ends of its tooth spaces, said annular member having twice as many teeth as said inner member, the tooth spaces of said annular member having parallel opposed walls, the teeth of said inner member having top portions which are of cylindrical cross-section of more than 180 degrees angular extent, the diameter of the cylindrical portion of said teeth being substantially equal to the distance between the parallel opposed walls of the tooth spaces of said annular member to operate therein as pistons, guide means for guiding said members for relative revolving movement of said inner member around the interior of said annular member, the teeth of said inner member having ports at the crests thereof, fluid supply and discharge passages, and means for connecting said supply and discharge passages sequentially to said ports.

20. A hydraulic unit comprising an annular member having internal radially directed teeth defining tooth spaces therebetween, an externally toothed inner member having teeth conjugate to the teeth of said annular member and meshed therewith, closure plates at the sides of said annular member closing the ends of its tooth spaces, said annular member having twice as many teeth as said inner member, the tooth spaces of said annular member having parallel opposed walls, the teeth of said inner member having top portions which are of cylindrical cross-section of more than 180 degrees angular extent, the diameter of the cylindrical portion of said teeth being substantially equal to the distance between the parallel opposed walls of the tooth spaces of said annular member to operate therein as pistons, guide means for guiding said members for relative revolving movement of said inner member around the interior of said annular member, said unit having supply and discharge passages connected to chambers defined by the tooth spaces of said annular member and a tooth of said inner member.

21. A unit as defined in claim 20 in which said passages terminate in ports formed in one of said closure plates.

22. A unit as defined in claim 21 comprising means mounting said annular member in fixed position, and means mounting said inner member for revolving movement about the axis of said annular member and for rotation about its own axis.

No references cited.